(12) United States Patent
Jiang et al.

(10) Patent No.: US 10,011,488 B2
(45) Date of Patent: Jul. 3, 2018

(54) METHOD FOR MAKING CARBON FIBER FILM

(71) Applicants: Tsinghua University, Beijing (CN); HON HAI PRECISION INDUSTRY CO., LTD., New Taipei (TW)

(72) Inventors: Kai-Li Jiang, Beijing (CN); Jia-Ping Wang, Beijing (CN); Shou-Shan Fan, Beijing (CN); Xiao-Yang Lin, Beijing (CN); Wei Zhao, Beijing (CN); Peng Liu, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 674 days.

(21) Appl. No.: 14/526,449

(22) Filed: Oct. 28, 2014

(65) Prior Publication Data

US 2016/0023903 A1   Jan. 28, 2016

(30) Foreign Application Priority Data

Jul. 25, 2014  (CN) .......................... 2014 1 0358049

(51) Int. Cl.
   *D01F 9/12*     (2006.01)
   *C01B 31/02*    (2006.01)
   *C01B 31/04*    (2006.01)

(52) U.S. Cl.
   CPC ...... *C01B 31/0226* (2013.01); *C01B 31/0446* (2013.01); *D01F 9/12* (2013.01)

(58) Field of Classification Search
   CPC ............ C01B 31/0226; C01B 31/0446; C01B 31/024; D01F 9/12; D01F 11/125
   See application file for complete search history.

(56) References Cited

U.S. PATENT DOCUMENTS

| 6,514,072 | B1* | 2/2003 | Bencic | F26B 3/283 |
| | | | | 432/59 |
| 6,582,673 | B1* | 6/2003 | Chow | B82Y 30/00 |
| | | | | 423/445 B |
| 6,787,229 | B1* | 9/2004 | Muradov | B82Y 30/00 |
| | | | | 423/447.1 |
| 7,939,218 | B2 | 5/2011 | Niu | |
| 8,790,744 | B2 | 7/2014 | Wang et al. | |

(Continued)

FOREIGN PATENT DOCUMENTS

| CN | 1460638 | 12/2003 |
| CN | 1631848 | 6/2005 |

(Continued)

OTHER PUBLICATIONS

Li et al., "Self-Assembly of Graphene on Carbon Nanotube Surfaces", Scientific Reports, 3:2353, Aug. 2013.*

*Primary Examiner* — Galen H Hauth
(74) *Attorney, Agent, or Firm* — ScienBiziP, P.C.

(57) ABSTRACT

A method for making carbon fiber film includes drawing a carbon nanotube film from a carbon nanotube array. The carbon nanotube film is successively passed through a first room and a second room. A carrier gas and a carbon source gas are supplied to the first room and a carbon layer is formed on the carbon nanotube film located in the first room. The carbon nanotube film with the carbon fiber film is taken into the second room from the first room, and the carbon layer is graphitized.

18 Claims, 5 Drawing Sheets

(56) References Cited

U.S. PATENT DOCUMENTS

| | | |
|---|---|---|
| 8,840,991 B2 | 9/2014 | Liu et al. |
| 2004/0121122 A1 | 6/2004 | Reynolds, III et al. |
| 2006/0188774 A1 | 8/2006 | Niu et al. |
| 2008/0241779 A1* | 10/2008 | Kamiyama ............... F27B 9/04 432/19 |
| 2009/0117434 A1 | 5/2009 | Liu et al. |
| 2009/0117437 A1 | 5/2009 | Liu et al. |
| 2010/0124622 A1 | 5/2010 | Wang et al. |
| 2011/0266028 A1* | 11/2011 | Pei ........................ B32B 37/24 174/126.1 |
| 2011/0318568 A1 | 12/2011 | Liu et al. |
| 2012/0103510 A1 | 5/2012 | Wang et al. |
| 2012/0205834 A1* | 8/2012 | Lemaire ................ B82Y 30/00 264/171.26 |
| 2012/0251766 A1 | 10/2012 | Jiang et al. |
| 2012/0267581 A1 | 10/2012 | Cai et al. |
| 2014/0057178 A1 | 2/2014 | He et al. |
| 2014/0302394 A1 | 10/2014 | Yue et al. |

FOREIGN PATENT DOCUMENTS

| | | |
|---|---|---|
| CN | 1754277 | 3/2006 |
| CN | 101107734 A | 1/2008 |
| CN | 101425584 | 5/2009 |
| CN | 101425584 A | 5/2009 |
| CN | 101734618 | 6/2010 |
| CN | 101880036 | 11/2010 |
| CN | 101880036 A | 11/2010 |
| CN | 102049890 | 5/2011 |
| CN | 103199254 A | 7/2013 |
| TW | 201241843 | 10/2012 |
| TW | 201242892 | 11/2012 |
| TW | 201409809 | 3/2014 |

\* cited by examiner

METHOD FOR MAKING CARBON FIBER FILM

CROSS-REFERENCE TO RELATED APPLICATIONS

This application claims all benefits accruing under 35 U.S.C. § 119 from China Patent Application No. 201410358049.4, filed on Jul. 25, 2014, in the China Intellectual Property Office. This application is related to commonly-assigned application entitled, "CARBON FIBER FILM", concurrently filed Ser. No. 14/526,459; "CATHODE OF LITHIUM-ION BATTERY", concurrently filed Ser. No. 14/526,458); "MEMBRANE ELECTRODE ASSEMBLY OF FUEL CELL", concurrently filed Ser. No. 14/526,456. Disclosures of the above-identified applications are incorporated herein by reference.

FIELD

The present application relates to a method for making carbon fiber film, and particularly to a method for making a vapor grown carbon fiber film.

BACKGROUND

Vapor grown carbon fibers (VGCFs) have a high specific strength, a specific modulus, and a crystalline orientation. In addition, VGCFs have good electrical conductivity, and thermal conductivity. Thus, VGCFs have attracted much attention in recent years.

VGCFs is conventionally prepared by catalytic cracking a hydrocarbon compound and vapor depositing on transition metal, such as iron, cobalt, nickel, or any combination alloy thereof. In detail, a substrate is located into a reaction tube, wherein the substrate is coated a metal granule layer acted catalyst, and then a mixing gas including a hydrocarbon and a hydrogen is supplied into the reaction tube, finally VGCFs are grown on the substrate. However, above-described method for making VGCFs is difficult to continuous and batch production.

What is needed, therefore, is to provide a method for making carbon fiber film that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

Figure 1:
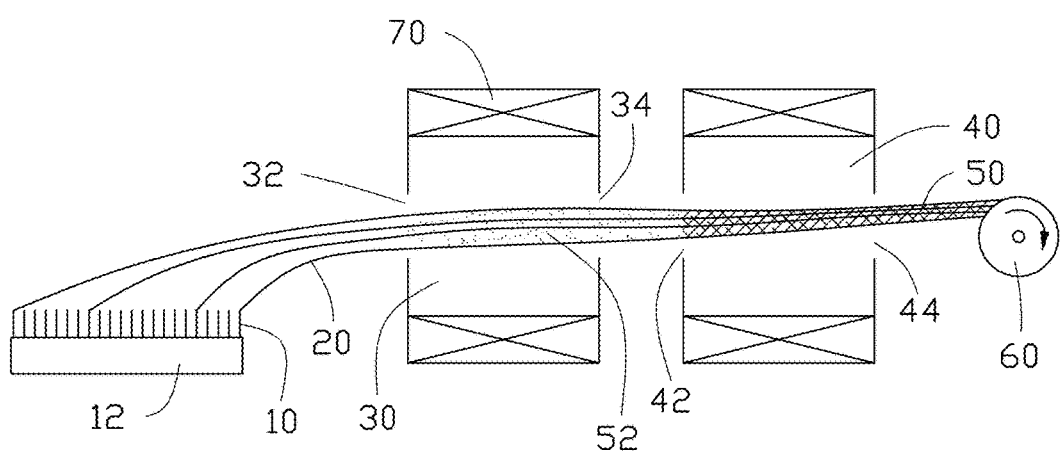
FIG. 1 is a schematic view of one embodiment of a device using for making a carbon fiber film.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Referring to FIG. 1, a method for making a carbon fiber film of one embodiment includes the following steps:

(S10), providing a carbon nanotube array 10;

(S20), forming a carbon nanotube film 20 by pulling from the carbon nanotube array 10, and making the carbon nanotube film 20 successively pass through a first room 30 and a second room 40;

(S30), supplying a carrier gas and a carbon source gas to the first room 30 and forming a carbon layer 52 on the carbon nanotube film 20 located in the first room 30 by controlling a temperature of the first room 30, wherein the carbon nanotube film 20 and the carbon layer 52 form a carbon nanotube composite film; and (S40), taking the carbon nanotube composite film into the second room 40 from the first room 30, and graphitizing the carbon layer 52 by controlling a temperature of the second room.

In the step (S10), the carbon nanotube array 10 can be a super-aligned array formed by a chemical vapor deposition method. The chemical vapor deposition method for making the carbon nanotube array generally includes the following steps:

(S11), providing a substrate 12, wherein the substrate 12 can be a substantially flat and smooth silicon substrate with a diameter of 4 inches, and the silicon substrate can be a P-type silicon wafer, an N-type silicon wafer or a silicon wafer formed with an oxidized layer thereon. In one embodiment, a 4-inch, P-type silicon wafer is used as the substrate 12.

(S12), forming a catalyst layer on the substrate 12, wherein the catalyst layer is made of a material selected from the group consisting of iron (Fe), cobalt (Co), nickel (Ni), and an alloy thereof. In one embodiment, the catalyst layer is Fe;

(S13), annealing the substrate 12 with the catalyst layer in air at a temperature in a range from 700° C. to 900° C. for about 30 minutes to about 90 minutes; and (S14), providing a carbon source gas at high temperature to a furnace for about 5 minutes to about 30 minutes to grow the carbon nanotube array 10 on the substrate 12, wherein the substrate 12 has been put in the furnace which has been heated to a temperature of 400° C.-740° C. and is filled with a protective gas. The carbon source gas can be, e.g., methane, ethylene, propylene, acetylene, methanol, ethanol, or a mixture thereof. The protective gas can, preferably, be made up of at least one of nitrogen (N2), ammonia (NH3), and a noble gas in the present embodiment.

Moreover, the carbon nanotube array 10 formed under the above conditions is essentially free of impurities such as carbonaceous or residual catalyst particles. The carbon nanotube array 10 includes a plurality of carbon nanotubes parallel to each other and perpendicular to a top surface of the substrate 12.

In the step (S20), the carbon nanotube film 20 is obtained by extracting a portion of the carbon nanotube array 10 by the substeps of:

(S21), selecting some carbon nanotube segments of the carbon nanotube array 10 having a determined width, and then using a drawing tool with the predetermined width to secure the end of the carbon nanotube segments of the carbon nanotube array 10; and (S22), pulling the drawing tool away from the carbon nanotube at an even/uniform speed to make the carbon nanotube segments of the carbon nanotube array 10 separate from the carbon nanotube array 10.

In the step (S22), the pulling direction can be substantially perpendicular to the growing direction of the carbon nanotube array 10. The drawing tool can be a nipper, a clamp, an adhesive tape, and so on.

In the step (S22), during the extracting process, when the end of the carbon nanotube segments of the carbon nanotubes of the carbon nanotube array 10 is drawn out, other carbon nanotube segments are also drawn out in a manner that ends of a carbon nanotube is connected with ends of adjacent carbon nanotubes, by the help of the van der Waals attractive force between the ends of carbon nanotube segments. This characteristic of the carbon nanotubes ensures that a continuous carbon nanotube film 20 can be formed.

A width of the carbon nanotube film 20 is related to a size of the carbon nanotube array 10. A length of the carbon nanotube film 20 can be selected according to need. In one embodiment, when the carbon nanotube array 10 is 4-inch, the width of the carbon nanotube film 20 is in a range from about 0.5 nanometers to about 10 centimeters, and a thickness of the carbon nanotube film 20 is in a range from about 0.5 nanometers to about 10 microns.

Figure 2:
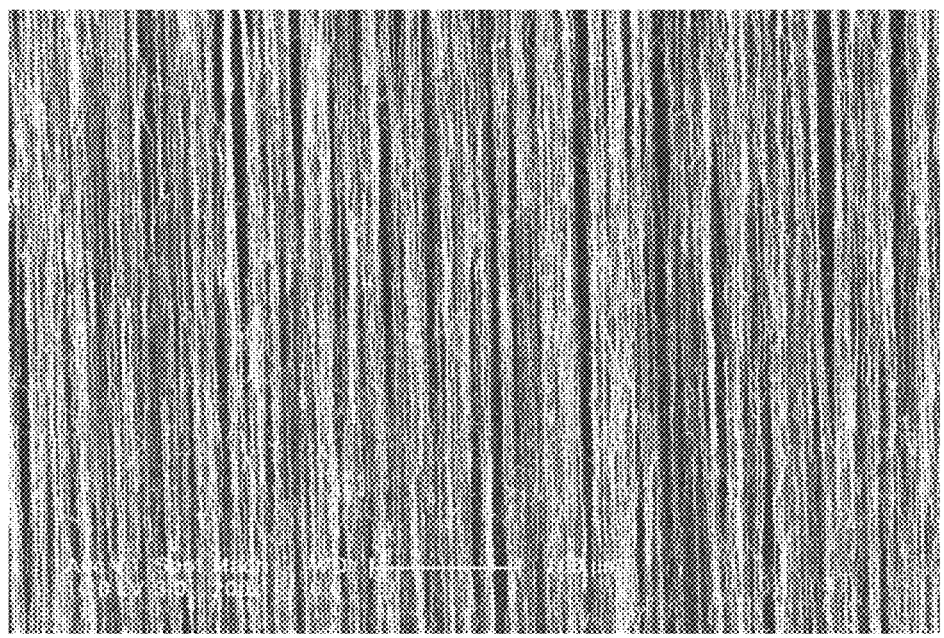
FIG. 2 is a scanning electron microscope (SEM) image of a carbon nanotube film.

Referring to FIG. 2, the carbon nanotube film 20 includes a plurality of carbon nanotubes uniformly distributed therein. The plurality of carbon nanotubes can be combined by van der Waals attractive force. The carbon nanotube film 20 can be a substantially pure structure of the carbon nanotubes, with few impurities. The plurality of carbon nanotubes may be single-walled, double-walled, multi-walled carbon nanotubes, or their combinations. The carbon nanotubes which are single-walled have a diameter of about 0.5 nanometers (nm) to about 50 nm. The carbon nanotubes which are double-walled have a diameter of about 1.0 nm to about 50 nm. The carbon nanotubes which are multi-walled have a diameter of about 1.5 nm to about 50 nm.

The carbon nanotube film 20 is a free-standing film. The term "free-standing" includes, but not limited to, the carbon nanotube film 20 that does not have to be supported by a substrate. For example, the free-standing carbon nanotube film 20 can sustain the weight of itself when it is hoisted by a portion thereof without any significant damage to its structural integrity. So, if the free-standing carbon nanotube film 20 is placed between two separate supporters, a portion of the free-standing carbon nanotube film 20, not in contact with the two supporters, would be suspended between the two supporters and yet maintain film structural integrity.

The first room 30 can define a first inlet opening 32 and a first outlet opening 34 opposite to the first inlet opening 32. The second room 40 can define a second inlet opening 42 and a second outlet opening 44 opposite to the second inlet opening 42. The carbon nanotube film 20 is successively pass through entire first room 30 and entire second room 40 by using the drawing tool, and fixed on a supporting shaft 60, as shown in FIG. 1. The supporting shaft 60 can rotate around its axis, the carbon nanotube film 20 can be collected on the supporting shaft 60.

In the step (S30), forming the carbon layer 52 on the carbon nanotube film 20 includes the following steps:

(S31), supplying the carrier gas to the first room 30;

(S32), supplying the carbon source gas to the first room 30; and (S33), heating the first room 30 to a temperature from about 800 degrees Celsius to about 1000 degrees Celsius, and cracking the carbon source gas to form a plurality of amorphous carbons, wherein the plurality of amorphous carbons is deposited on the carbon nanotube film 20 in the first room 30.

In the step (S31), the first room 30 can be purified by the carrier gas. The carrier gas includes nitrogen, ammonia, or inert gas, such as argon. A flow speed of the carrier gas can range from about 50 sccm to about 100 sccm.

In the step (S32), the carbon source gas can be a hydrocarbon compound, such as alkyne. A flow speed of the carrier gas can range from about 20 sccm to about 100 sccm.

In the step (S33), a heater 70 surrounds the first room 30 and heats the first room 30 to the temperature from about 800 degrees Celsius to about 1000 degrees Celsius. In one embodiment, when a time of supplying the carbon source gas ranges from about 30 minters to about 60 minters, a thickness of the carbon layer 52 ranges from about 5 nanometers to about 10 microns. In order to uniformly cover the carbon nanotube film 20 and enclose each of the plurality of carbon nanotubes, the thickness of the carbon layer 52 is greater than or equal to 5 nanometers. The thickness of a composite structure including the carbon layer 52 and the carbon nanotube film 20 is greater than or equal to 30 nanometers.

In the process of forming the carbon layer 52, a pressure in the first room 30 can be in a range from about 50 Pa to about 1000 Pa. The carbon nanotube film 20 cannot be destroyed because the inert gas is in the first room 30 and the pressure in the first room 30 ranges from about 50 Pa to about 1000 Pa.

The carrier gas and the carbon source gas can be simultaneously supplied to the first room 30. At this time, the flow speed of the carrier gas ranges from about 10 sccm to about 50 sccm. In one embodiment, the carrier gas and the carbon source gas are simultaneously supplied to the first room 30, the flow speed of the carrier gas is 25 sccm, and the flow speed of the carbon source gas is 50 sccm.

The carbon nanotube film 20 defines a plurality of micropores, which is formed by two adjacent carbon nanotubes of the carbon nanotube film 20. The plurality of amorphous carbons formed by cracking the carbon source gas is deposited on a surface of the plurality of carbon nanotubes, and deposited in the plurality of micropores. The carbon layer 52 thus encloses each of the plurality of carbon nanotubes.

In the step (S40), the supporting shaft 60 is rolled, and the carbon nanotube film 20 continues to be pulled from the carbon nanotube array 10. The carbon nanotube composite film in the first room 30 is passed through the first outlet opening 34 and the second inlet opening 42 and into the second room 40.

There is a vacuum in the second room 40. A pressure in the second room 40 ranges from about 50 Pa to about 1000 Pa. The heater 70 surrounds the second room 40 and heats the second room 40 to a temperature from about 2000 degrees Celsius to about 3000 degrees Celsius. The carbon layer 52 thus is graphitized. A plurality of carbons of the carbon layer 52 is changed to $SP^2$ hybrid structure joined with covalent bond from amorphous. The carbon nanotube film 20 cannot be destroyed in the second room 40 because the vacuum is in the second room 40. The plurality of carbon nanotubes of the carbon nanotube film 20 is $SP^2$ hybrid graphene layer structure. Original structure defects of the plurality of carbon nanotubes in the carbon nanotube film 20 can be repaired by heating in the vacuum. In the process of forming the carbon layer 52 and graphitizing carbon layer 52, the pressure in the first room 30 and the second room 40 can be normal pressure. The normal pressure can be 101000 Pa. When the carbon layer 52 is formed in normal pressure, the carbon source gas and the inert gas can protect the carbon layer 52 from damage. When the carbon layer 52 is graphitized in normal pressure, the inert gas can protect carbon structure of the carbon fiber film 50.

In one embodiment, when the thickness of the carbon layer 52 is greater than a diameter of the plurality of carbon nanotubes, after graphitizing the carbon layer 52 to form a plurality of graphene sheets, it is difficult for the graphene sheets to be parallel to extending directions of the carbon nanotubes. Therefore, an angle can be formed between each graphene sheet and each carbon nanotube. In one embodiment, the thickness of the carbon layer 52 is greater than or equal to 100 nanometers.

A length of the plurality of graphene sheets is greater than the diameter of the plurality of carbon nanotubes and in a range from about 50 nanometers to about 10 microns. A width of the plurality of graphene sheets is in a range from about 10 nanometers to about 20 nanometers. A time for graphitizing the carbon layer 52 is related to the thickness of the carbon layer 52. The greater the thickness of the carbon layer 52, the longer the time lasts. In one embodiment, the thickness of the carbon layer 52 is in a range from about 100 nanometers to about 10 microns, the time for graphitizing the carbon layer 52 is in a range from about 20 minutes to about 60 minutes.

The carbon layer 52 is graphitized to the plurality of graphene sheets, and the plurality of graphene sheets is joined with the carbon nanotube film 20, thus the carbon fiber film 20 is formed.

The supporting shaft 60 is rolled along the direction of pulling the carbon nanotube film 20, and the carbon nanotube film 20 continues to be pulled from the carbon nanotube array 10, at the same time the carbon layer 52 in the first room 30 is passed through the first outlet opening 34 and the second inlet opening 42 and into the second room 40 and graphitized in the second room 40.

It is to be understood that, in one embodiment, when rolling the supporting shaft 60 along the direction of pulling the carbon nanotube film 20, the carbon nanotube film 20 is formed by pulling from the carbon nanotube array 10, while the carbon layer 52 is formed on the carbon nanotube film 20 and then graphitized, and at the same time the carbon fiber film 50 is rolled to the supporting shaft 60. Therefore, the carbon fiber film 50 can achieve continuous and batch production.

The supporting shaft 60 can be rolled along a direction substantially perpendicular to the pulling direction of the carbon nanotube film 20, and the carbon fiber film 50 thus is twisted to a string structure, improving the mechanical strength of the carbon fiber film 20.

In the process of forming and graphitizing the carbon layer 52, the carbon nanotube film 20 is suspended. The carbon nanotube film 20 has a first end and a second end opposite to the first end, the first end of the carbon nanotube film 20 is connected to the carbon nanotube array 10, and the second end of the carbon nanotube film 20 is held by the supporting shaft 60. The supporting shaft 60 can be fixed on a rotating machine to pull and rotate simultaneously.

Figure 3:
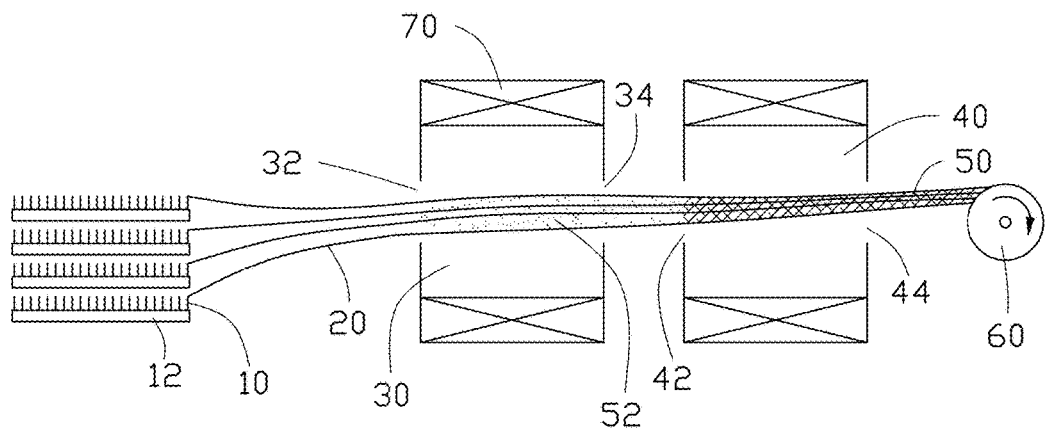
FIG. 3 is a schematic view of another embodiment of a device using for making the carbon fiber film.

Referring to FIG. 3, an embodiment of the method for making the carbon fiber film 50 is shown where a plurality of carbon nanotube films 20 are respectively pulled from a plurality of carbon nanotube arrays 10, and a carbon layer 52 is formed on each of the plurality of carbon nanotube films 20 and then graphitized. Thus, a plurality of carbon fiber films 50 can be simultaneously formed, improving yield of the carbon fiber film 50.

After forming the carbon fiber film 50, a plurality of conductive particles can be deposited on the carbon fiber film 50, further improving the electrical conductivity of the carbon fiber film 50. The plurality of conductive particles can be deposited on the surface of the plurality of carbon nanotubes 56 and the surface of the plurality of graohene sheets 58. The plurality of conductive particles includes alloy nanoparticles, metal-oxide nanoparticles, graphite oxide composite nanoparticles, or their combinations. The alloy nanoparticle may be $Cu_6Sn_5$, $Mg_2Sn$, $CoSn$, $NiSn_4$, $CeSn_3$, or their combinations. The metal-oxide nanoparticle may be $SnO_2$, $Fe_2O_3$, $CoO$, $CuO$, $NiO_2$, or their combinations. The graphite oxide composite nanoparticles may be composites of the graphite oxide and metal-oxide nanoparticles as described above. The nanoparticles have diameters of about 1 nanometer (nm) to about 50 nm. In one embodiment, the nanoparticles are $SnO_2$ and have diameters of about 2 nm to about 3 nm.

Figure 4:
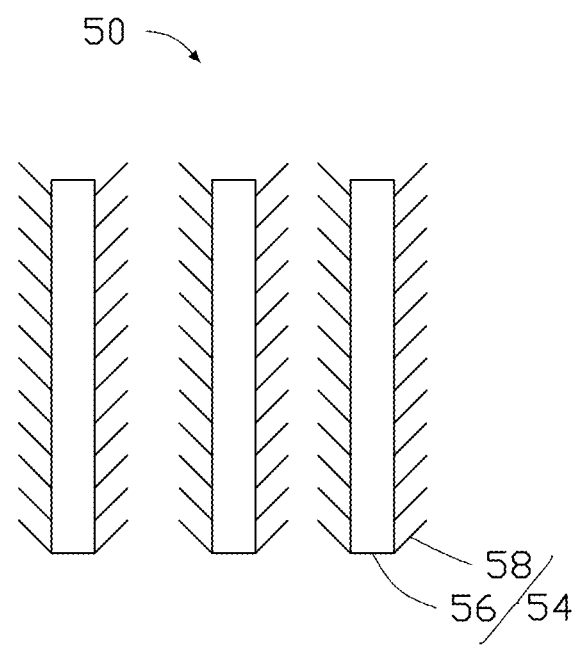
FIG. 4 is a schematic view of one embodiment of the carbon fiber film.
Figure 5:
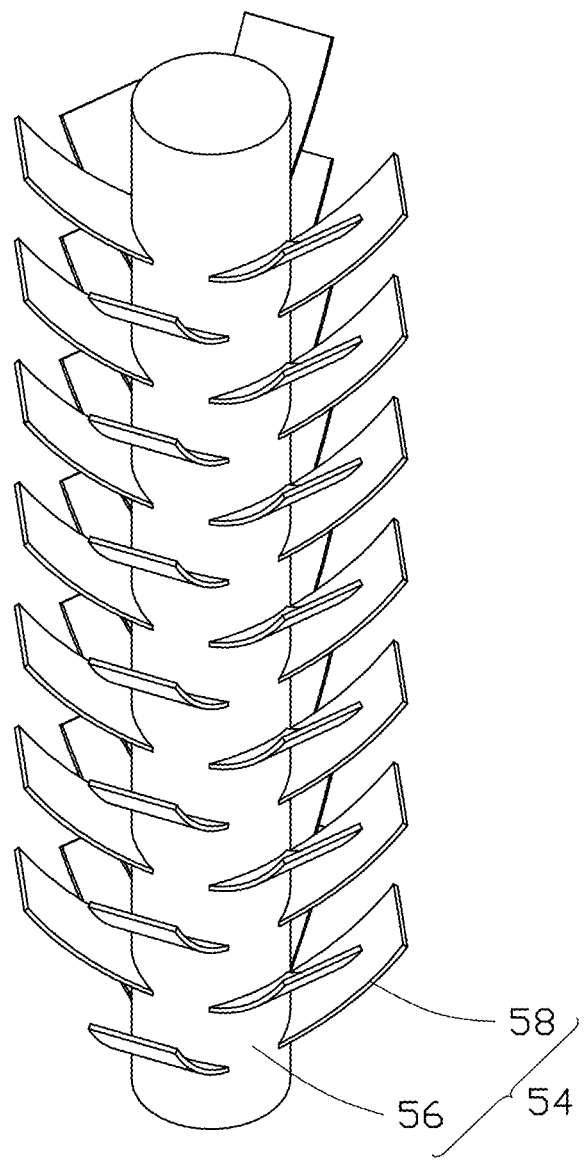
FIG. 5 is a three-dimensional schematic view of one carbon fiber of the carbon fiber film of FIG. 4.

Referring to FIGS. 4 and 5, the carbon fiber film 50 is a membrane structure. The carbon fiber film 50 includes a plurality of carbon nanotubes 56 and a plurality of graphene sheets 58. The plurality of carbon nanotubes 56 are joined end to end by van der Waals attractive force and extend along a same direction. Each of the plurality of carbon nanotubes 56 is surrounded by the plurality of graphene sheets 58. Part of edge of each of the plurality of graphene sheets 58 is joined with the carbon nanotube 56 by covalent bond. An angle is between each graphene sheet 58 and an outside wall of the carbon nanotube 56. The plurality of graphene sheets 58 are interval distribution on the outside wall of the carbon nanotube 56, and a distance between two adjacent graphene sheets is arbitrary. The length of the plurality of graphene sheets 58 is greater than the diameter of the carbon nanotube 56 and ranges from about 50 nanometers to about 10 microns. The width of the plurality of graphene sheets 58 is similar to the diameter of the carbon nanotube 56 and ranges from about 10 nanometers to about 20 nanometers. An extending length of each graphene sheet 58 is 2.5 times −100 times as long as the diameter of the carbon nanotube 56.

The carbon fiber film 50 includes a plurality of carbon fibers 54 joined end to end. The plurality of carbon fibers 54 extends along a same direction. Each carbon fiber 54 includes a carbon nanotube 56 and the plurality of graphene sheets 58. The plurality of graphene sheets 58 forms a graphene layer. Two adjacent carbon fibers 54 are joined by van der Waals attractive force. In the carbon fiber film 50, two adjacent carbon fibers 54 side by side may be spaced apart from each other. Pores are defined in the carbon fiber film 50 by adjacent carbon fibers 54.

The plurality of carbon nanotubes 56 is uniformly distributed and substantially parallel to a surface of the carbon fiber film 50. The carbon fiber film 50 is a free-standing film and can bend to desired shapes without breaking.

The angle between each graphene sheet 58 and the carbon nanotube 56 can range from about 0 degrees to about 90 degrees. In one embodiment, the angle between each graphene sheet 58 and the carbon nanotube 56 is in a range from about 30 degrees to about 60 degrees. In one embodiment, the angles between each graphene sheet 58 and the carbon nanotube 56 are equal to 45 degrees, as shown in FIG. 4. A diameter of each carbon fiber 54 is related to the thickness of the carbon layer 52. The diameter of the plurality of carbon fibers 54 can be in a range from about 450 nanometers to about 100 microns. In one embodiment, the diameter of the plurality of carbon fibers 54 is about 500 nanometers.

The carbon fiber film 50 can include at least two stacked carbon nanotube films 20, adjacent carbon nanotube films 20 can be combined by only the van der Waals attractive force therebetween. Additionally, an angle between the extending directions of the carbon nanotubes in two adjacent carbon nanotube films 20 can be in a range from about 0 degrees to about 90 degrees. Stacking the carbon nanotube films 20 will improve the mechanical strength of the carbon fiber film 50. In one embodiment, the carbon fiber film 50 includes two layers of the carbon nanotube films 20, and the angle between the extending directions of the carbon nanotubes in two adjacent carbon nanotube films 20 is about 90 degrees.

The carbon fiber film 50 has good electrical conductivity. A sheet resistance of the carbon fiber film 50 is less than or equal to 100 ohm. Two adjacent carbon nanotubes 56 are joined end to end by combining a graphene sheet 58, and the graphene sheet 58 is combined with the two adjacent carbon nanotubes 56 by the covalent bond. Therefore, the mechanical strength of the carbon fiber film 50 is further improved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may include some indication in reference to certain steps. However, the indication used is only to be viewed for identification purposes and not as a suggestion as to an order for the steps.

What is claimed is:

1. A method for making carbon fiber film comprising:
   drawing a carbon nanotube film from a carbon nanotube array, and making the carbon nanotube film successively pass through a first room and a second room;
   supplying a carrier gas and a carbon source gas to the first room and forming a carbon layer on the carbon nanotube film located in the first room; and
   taking the carbon nanotube film with the carbon layer into the second room from the first room, graphitizing the carbon layer, wherein the carbon nanotube film is suspended in a process of graphitizing the carbon layer; and the carbon nanotube film comprises a first end and a second end opposite to the first end, in the process of graphitizing the carbon layer, the first end is connected to the carbon nanotube array, and the second end is held by a supporting shaft.

2. The method of claim 1, wherein in a process of the forming the carbon layer, the carbon nanotube film is suspended.

3. The method of claim 2, wherein the first end of the carbon nanotube film is connected to the carbon nanotube array, and the second end of the carbon nanotube film is held by the supporting shaft.

4. The method of claim 1, wherein the forming the carbon layer comprises:
   supplying the carrier gas to the first room;
   supplying the carbon source gas to the first room; and
   heating the first room to a temperature from about 800 degrees Celsius to about 1000 degrees Celsius, and cracking the carbon source gas to form a plurality of amorphous carbons, wherein the plurality of amorphous carbons is deposited on the carbon nanotube film in the first room.

5. The method of claim 4, further comprising depositing the plurality of amorphous carbons on a surface of a plurality of carbon nanotubes of the carbon nanotube film, and in a plurality of micropores formed by adjacent carbon nanotubes.

6. The method of claim 5, wherein the carbon layer encloses each of the plurality of carbon nanotubes.

7. The method of claim 1, wherein a thickness of the carbon layer is greater than or equal to 5 nanometers.

8. The method of claim 1, wherein a thickness of the carbon layer is greater than or equal to 100 nanometers.

9. The method of claim 1, wherein the carbon nanotube film successively passes through the entire first room and the entire second room by using a drawing tool, and the carbon nanotube film is fixed on a supporting shaft.

10. The method of claim 9, wherein when the supporting shaft is rolled, the carbon nanotube film continues to be pulled from the carbon nanotube array, and the carbon nanotube film with the carbon layer in the first room is pulled into the second room.

11. The method of claim 1, wherein a pressure in the first room is in a range from about 50 Pa to about 1000 Pa.

12. The method of claim 1, wherein a pressure in the second room is in a range from about 50 Pa to about 1000 Pa.

13. The method of claim 1, wherein the carbon layer is graphitized to form a plurality of graphene sheets joined with the carbon nanotube film by a covalent bond.

14. The method of claim 1, further comprising depositing a plurality of conductive particles after graphitizing the carbon layer.

15. A method for making carbon fiber film comprising:
   drawing a carbon nanotube film from a carbon nanotube array;
   forming a carbon layer on the carbon nanotube film by cracking a carbon source gas; and
   graphitizing the carbon layer, wherein the carbon nanotube film is suspended in a process of forming and graphitizing the carbon layer; and the carbon nanotube film comprises a first end and a second end opposite to the first end, in the process of graphitizing the carbon layer, the first end is connected to the carbon nanotube array, and the second end is held by a supporting shaft.

16. The method of claim 15, further comprising pulling the carbon nanotube film into a first room, and supplying a carrier gas and the carbon source gas to the first room to form the carbon layer in the first room.

17. The method of claim 15, further comprising making the carbon nanotube film with the carbon layer into a second room, and heating the second room to a temperature from about 2000 degrees Celsius to about 3000 degrees Celsius for graphitizing the carbon layer.

18. The method of claim 15, further comprising depositing a plurality of conductive particles after graphitizing the carbon layer.

* * * * *